(12) United States Patent
Minowa et al.

(10) Patent No.: US 6,981,093 B2
(45) Date of Patent: Dec. 27, 2005

(54) STORAGE SYSTEM INCLUDING A STORAGE CONTROL APPARATUS WHICH CONTROLS OPERATION OF THE SYSTEM BASED ON CONTROL INFORMATION STORED IN SHARED MEMORY

(75) Inventors: Nobuyuki Minowa, Ohi (JP); Yoshinori Okubo, Odawara (JP); Yasuhiro Igarashi, Chigasaki (JP)

(73) Assignees: Hitachi, Ltd., Tokyo (JP); Hitachi Software Co., Ltd., Yokohama (JP)

( * ) Notice: Subject to any disclaimer, the term of this patent is extended or adjusted under 35 U.S.C. 154(b) by 348 days.

(21) Appl. No.: 10/355,087

(22) Filed: Jan. 31, 2003

(65) Prior Publication Data

US 2003/0221070 A1 Nov. 27, 2003

(30) Foreign Application Priority Data

May 22, 2002 (JP) .............................. 2002-147921

(51) Int. Cl.[7] .......................................... G06F 12/00
(52) U.S. Cl. ........................ 711/113; 711/154; 711/162
(58) Field of Search ........................ 711/112, 113, 114, 711/118, 130, 147, 162, 154; 713/1, 2

(56) References Cited

U.S. PATENT DOCUMENTS

| 4,096,567 | A | | 6/1978 | Millard et al. |
|---|---|---|---|---|
| 5,287,473 | A | | 2/1994 | Mohan et al. |
| 5,568,633 | A | * | 10/1996 | Boudou et al. .............. 711/141 |
| 5,680,579 | A | | 10/1997 | Young et al. |
| 5,937,174 | A | | 8/1999 | Weber |
| 6,356,978 | B1 | * | 3/2002 | Kobayashi et al. ......... 711/113 |
| 6,799,244 | B2 | * | 9/2004 | Tanaka et al. .............. 711/113 |
| 2003/0204671 | A1 | | 10/2003 | Matsunami et al. |

OTHER PUBLICATIONS

Japanese Laid-Open Publication No.09-218750.
Japanese Laid-Open Publication No.10-198523 Others.
Japanese Laid-Open Publication No.2001-029068.

* cited by examiner

Primary Examiner—Pierre-Michel Bataille
(74) Attorney, Agent, or Firm—Mattingly, Stanger, Malur & Brundidge, P.C.

(57) ABSTRACT

In a disk array control apparatus having a plurality of magnetic disk apparatus under its command for controlling data transfers to and from a host computer in a multiprocessor configuration comprising a plurality of microprocessors, a data path is provided between a cache unit and a shared memory unit, provided independent of the cache unit, for storing configurational information and the like required for system operation and control by the microprocessors, so that in the event of trouble with the apparatus or a sudden abnormality in main power supply, configurational information in a volatile shared memory unit is saved into non-volatile magnetic disk apparatuses from the data path via the cache unit by utilizing an uninterrupted power supply apparatus (UPS).

3 Claims, 10 Drawing Sheets

PROCEDURE OF RESTORATION

STORAGE SYSTEM INCLUDING A STORAGE CONTROL APPARATUS WHICH CONTROLS OPERATION OF THE SYSTEM BASED ON CONTROL INFORMATION STORED IN SHARED MEMORY

BACKGROUND OF THE INVENTION

The present invention relates to a storage system, and more particularly to a technique that can be effectively applied to a storage system provided with a storage control apparatus which is configured of multiprocessors sharing a memory and in which data from a host computer is stored dispersedly among a plurality of storage apparatuses.

DESCRIPTION OF THE PRIOR ART

A storage control apparatus, intervening between a disk array apparatus and a host computer, controls the writing and reading of data in and out of the disk array apparatus in accordance with data write and read instructions received from the host computer.

This storage control apparatus is configured of a multiprocessor provided with a processor for controlling the delivery of information to and from the host computer and a processor for controlling the delivery of information to and from the disk array apparatus, and the linked operation of these processors via a shared memory causes data transfers between the host computer and the disk array apparatus to be controlled.

In this shared memory are accumulated sets of configurational information regarding how the storage control apparatus operates the disk array apparatus under its command, and each microcomputer, referencing these sets of information, controls the writing of information received from the host computer into the disk array apparatus.

On the other hand, such a storage control apparatus has a cache memory into which data delivered between the host computer and the disk array apparatus are temporarily stored.

It is also conceivable to use of part of this cache memory as the aforementioned shared memory, but it is preferable to separately arrange a shared memory in addition to the cache memory from the viewpoint of performance improvement of the processors because of differences between the cache memory and the shared memory in access form in respect of the quantity of data per access among other factors.

Incidentally, in the storage control apparatus, an uninterrupted power supply (UPS) unit is provided as a backup arrangement in case of power failure or the like not only for the cache memory for temporary storage of information from the host computer but also for this shared memory.

Since such a shared memory or a cache memory is usually configured of a volatile semiconductor memory, it would lose data in it once power supply is interrupted.

The reason why the contents of the shared memory are also protected by backing up with the UPS unit or the like is that, if data in the shared memory disappears, control on data transfers from the host computer to the magnetic disk apparatus will be affected.

Especially data stored in a cache memory will become uncontrollable if cache control information stored in the shared memory is lost, and the performance after the restoration of the apparatus will be substantially degraded.

However, although such a technique permits temporary keeping of information in volatile memories including the shared memory and the cache memory, there is a limit to the length of time during which the stored information can be kept with power supplied from an auxiliary source such as the UPS unit, but in the case of power failure for a long period, the limit of the supply capacity from the auxiliary power source may be surpassed, resulting in the loss of information in the volatile memories.

Furthermore, as the configurational information of the apparatus is also stored in the shared memory, the loss of data in the shared memory would invite inconsistency in the hardware configuration. As a result, the reliability of data in an emergency and the extent of data restoration after the resumption of power supply from the external source may possibly deteriorate.

Incidentally in the Japanese Patent Laid-Open No. Hei 9-218750, there is disclosed a technique by which, if there is any data that cannot be written from a cache memory into a magnetic disk apparatus on account of trouble with a storage apparatus at the time of a planned stop of a magnetic disk subsystem, positional information on the data is recorded into a management table and at the same time the data itself is saved into a reserve area of the magnetic disk apparatus.

In addition, in the Japanese Patent Laid-Open No. Hei 10-198523, there is disclosed a technique by which the inside of a cache memory provided in a magnetic disk apparatus is dualized with a volatile memory and a non-volatile EEPROM, data to be written into the magnetic disk apparatus is doubly written into the volatile memory and the EEPROM, and in the case of a power failure, data to be written is restored by use of the data in the EEPROM in place of the lost data in the volatile memory.

SUMMARY OF THE INVENTION

One of the objects of the present invention, attempted from the above-stated and other points of view, is to provide a technique whereby it is made possible to semipermanently store control information in a shared memory by saving it into a non-volatile storage apparatus, to enhance the reliability of the control information in an emergency such as a power failure, and to increase the speed of restoring the control information.

Another object of the invention is to provide a technique whereby it is made possible, if control is interrupted by power failure or the like, to securely restore the control state before the interruption.

Still another object of the invention is to provide a technique whereby it is made possible, irrespective of the length of duration of the power failure state, to stably hold and restore the control state before the interruption.

Yet another object of the invention is to provide a technique whereby it is made possible, in preparation for any alteration in control information due to maintenance or the like, to stably hold and restore the control information before the alteration.

According to the invention, there is provided a storage system comprising a plurality of non-volatile storage apparatuses and a storage control apparatus which controls delivery of information between the storage apparatuses and a superior apparatus and is provided with a cache memory for temporarily storing the information and a shared memory for storing control information, wherein the storage control apparatus has a function to save the control information stored in the shared memory into the storage apparatuses.

In a more specific example of the invention, a disk array control apparatus in a storage system, such as a disk array apparatus, is provided with a function to save, in the event of trouble with the apparatus or a sudden abnormality in power supply, information in volatile memories into a non-volatile storage apparatus by utilizing an auxiliary power source. There is also provided a function to return, when the apparatus or the power supply is restored to normalcy, the information saved in the non-volatile storage apparatus into the volatile memories.

As these functions can serve to enhance the effectiveness of the data stored in the cache memory, the performance can be prevented from deteriorating after the apparatus returns to normalcy, and the data can be restored easily and without fail, resulting in important contributions to improving the reliability and the working efficiency.

Since the invention makes it possible to prepare a backup of information in the shared memory, it is also effective for preserving information in the shared memory before any major alteration of the information in the shared memory.

Other features and objects of the present invention will be more fully understood from the description in this specification when taken in conjunction with the accompanying drawings.

BRIEF DESCRIPTION OF THE DRAWINGS

The following description can contribute to fuller understanding of the present invention and its advantages with reference to the accompanying drawings, wherein.

DETAILED DESCRIPTION OF PREFERRED EMBODIMENTS

Preferred embodiments of the present invention will be described below in detail with reference to the accompanying drawings.

(Embodiment 1)

Figure 1:
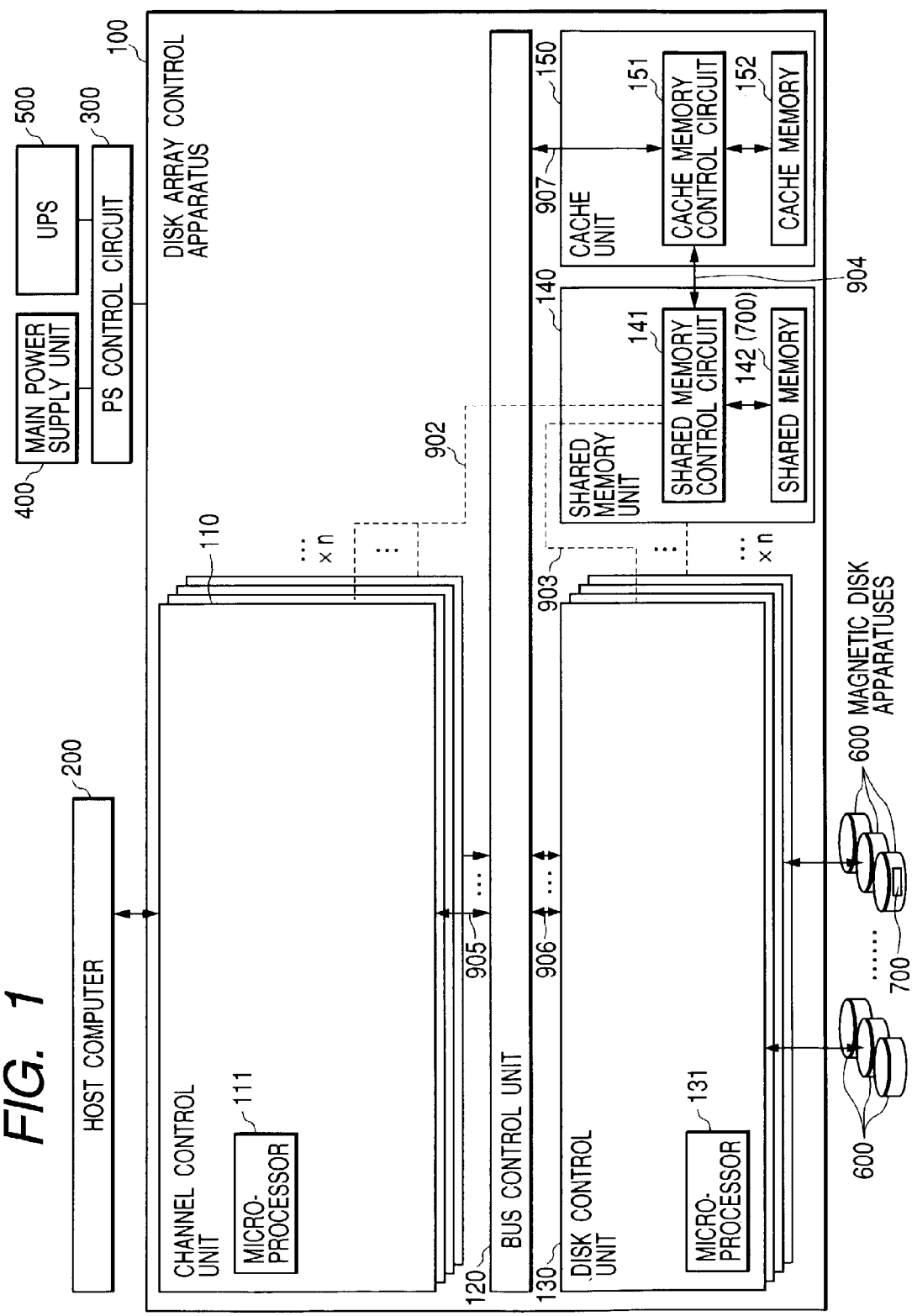
FIG. 1 is a conceptual diagram of one example of configuration of an information processing system containing a storage system, which is a preferred embodiment of the invention.

FIG. 1 is a conceptual diagram of one example of configuration of an information processing system containing a storage system, which is a preferred embodiment of the invention.

The information processing system in this embodiment of the invention is configured of a disk array system comprising a host computer 200 and elements operating under its command including a disk array control apparatus 100, a plurality of magnetic disk apparatuses 600 of a redundant configuration, and a PS control circuit 300 managing an uninterrupted power supply apparatus (UPS) 500 and a main power supply unit 400.

The disk array control apparatus 100 in this embodiment is configured of a channel control unit 110, a disk control unit 130, a bus control unit 120, a shared memory unit 140 and a cache unit 150.

The shared memory unit 140 has a shared memory control circuit 141 and a shared memory 142 connected to it, and the cache unit 150 has a cache memory control circuit 151 and a cache memory 152 connected to it.

To be able to control the delivery of information to and from one or a plurality of host computers 200, there are a plurality of channel control units 110. Each of the channel control units 110 has within it a microprocessor 111 for control use.

To be able to control the delivery of information to and from a plurality of magnetic disk apparatuses 600, there are a plurality of disk control units 130. Each of the disk control units 130 has within it a microprocessor 131 for control use.

The bus control unit 120 controls access to the cache unit 150 from the channel control unit 110 and the disk control units 130.

The cache unit 150, which controls temporary storage when data is transferred from the channel control unit 110 to the disk control units 130 or from the disk control units 130 to the channel control unit 110, comprises the cache memory control circuit 151 and the cache memory 152.

The shared memory unit 140, which stores and manages control information including cache address, and control information shared by the channel control unit 110 and the disk control units 130 (hereinafter these items of control information will be collectively referred to as configurational information 700), comprises the shared memory control circuit 141 and the shared memory 142.

Data written from a host computer 200 into a magnetic disk apparatus 600 is controlled by the microprocessor 111 mounted on the pertinent channel control unit 110, and written into the cache memory 152 via the cache memory control circuit 151. The data written into the cache memory 152 is controlled by the microprocessor 131 mounted on the pertinent disk control unit 130, and written into the magnetic disk apparatus 600 via the cache memory control circuit 151.

Data read out of a magnetic disk apparatus 600 is controlled by the microprocessor 131 mounted on the pertinent disk control unit 130, and written into the cache memory 152 via the cache memory control circuit 151. The data written into the cache memory 152 is controlled by the microprocessor 111 mounted on the pertinent channel control unit 110, and sent to the pertinent host computer 200 via the cache memory control circuit 151.

The configurational information 700 needed for the foregoing controls is placed on the shared memory 142, and referenced or updated by the microprocessor 111 on the pertinent channel control unit 110 and the microprocessor 131 on the pertinent disk control unit 130.

A cache memory path 905, a cache memory path 906 and a cache memory path 907 linking the channel control units 110, the cache unit 150 and the disk control units 130 have a structure characterized by awareness of the maximum transfer because a large quantity of data (e.g. a data block of several KB) is sent in a single attempt of access even if it involves a heavy protocol overhead. A shared memory path 902 and a shared memory path 903 linking the channel control units 110, the shared memory unit 140 and the disk control units 130 have a structure characterized by its quick access response and function to transfer a small quantity of data (e.g. a few bytes).

The shared memory control circuit 141 and the cache memory control circuit 151 are connected by a data path 904 comparable in performance to the cache memory paths 905, 906 and 907, and can copy any desired area in the shared memory 142 into any desired area in the cache memory 152 and any desired area in the cache memory 152 into any desired area in the shared memory 142 at instructions sent from the shared memory paths 903 and 902.

The cache memory control circuit 151 can either write data sent from the shared memory control circuit 141 into the cache memory 152 or transfer data directly from the cache memory control circuit 151 to any desired one of the disk control units 130 via the bus control unit 120. The disk control unit 130, upon receiving shared memory data, writes the data into a save area in the pertinent magnetic disk apparatus 600 to complete the saving of the shared memory data (the configurational information 700).

By having a plurality of disk control units 130 read shared memory data (the configurational information 700) out of the cache unit 150 on a task sharing basis, it is possible to shorten the length of time taken to save. The choice of the magnetic disk apparatuses 600 to write into is controllable by a microprogram in the microprocessor 131, and it is also possible to perform mirroring on a plurality of different magnetic disk apparatuses 600 to enhance reliability.

Next will be described how the configurational information 700 in the shared memory 142 is saved.

Figure 2:
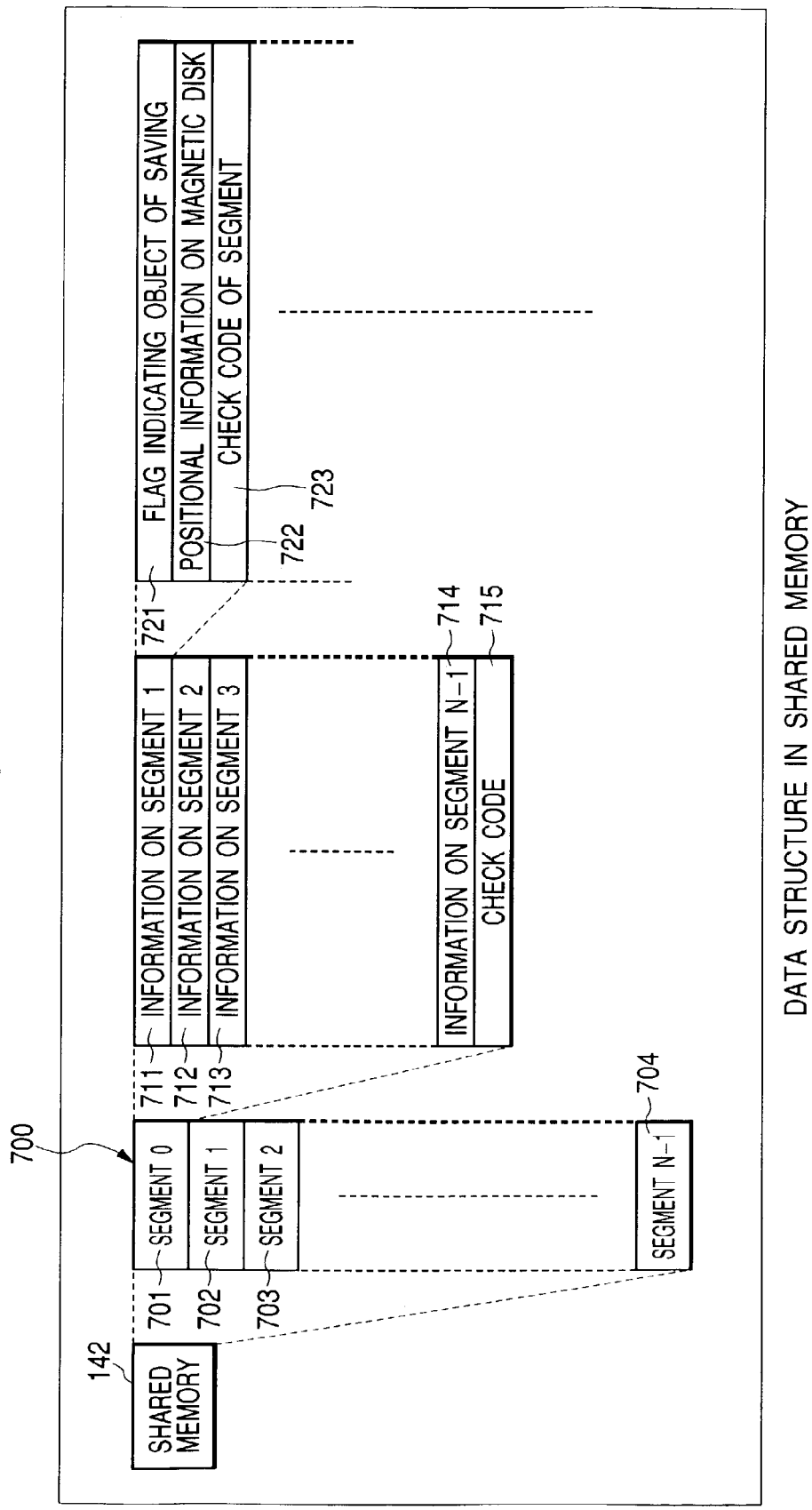
FIG. 2 is a conceptual diagram of one example of data structure in a shared memory in a storage system, which is the preferred embodiment of the invention.

The shared memory 142 (the configurational information 700) is divided into N segments from segment 0 [701] through segment N–1 [704] as shown in FIG. 2 and managed in this divided form, and saved into the magnetic disk apparatus 600 on a segment-by-segment basis.

Segment 0 [701] is a special segment, which manages information for use in saving other segments (segment 1 [702] through segment N–1 [704]). For this reason, the address in the magnetic disk apparatus 600 for saving segment 0 [701] is fixed; this segment is restored first at the time of actuating the disk array control apparatus 100 and, at the end, saved last after all other segments have been saved.

Segment 1 [702] to segment N–1 [704] can be used as user areas with no particular limitation.

Figure 3:
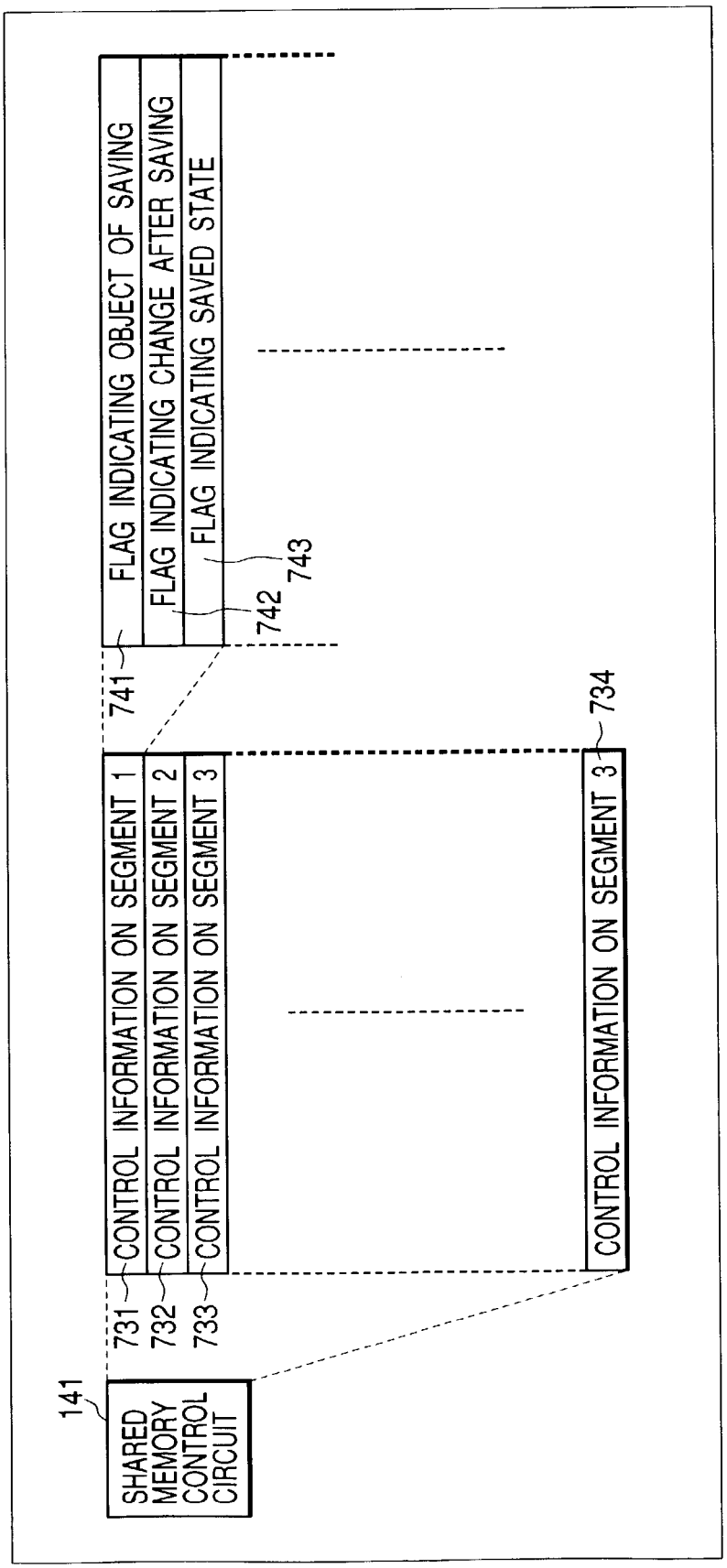
FIG. 3 is a conceptual diagram of one example of data structure in the shared memory in the storage system, which is the preferred embodiment of the invention.

The shared memory control circuit 141 contains control information as shown in FIG. 3.

A flag 741 indicating an object of save shows whether or not the corresponding segment needs to be saved. This flag makes it possible to set a segment in which only constant values and information that can be computed from other values are stored out of the range of save objects.

A flag 742 indicating an alteration after saving shows that the contents of the corresponding segment have been altered since the segment was saved last time. It is set when a write instruction is executed upon an address in the segment, and reset when the corresponding segment is saved.

A flag 743 indicating a segment being saved shows that the corresponding segment is now being saved. As long as this flag is set, an instruction to write into that segment is suppressed, and a report is given to the processor having issued the write instruction that the segment is being saved.

Hereupon, the operation that takes place until a segment is saved will be described with reference to FIG. 1, FIG. 2 and FIG. 3.

The microprocessor 131 in the pertinent disk control unit 130 checks control information sets 731 through 735 on the corresponding segments to search for a segment for which the flag 741 showing that the segment is to be saved and the flag 742 showing that the contents of the segment have been altered since it was saved last time are set and the flag 743 showing that the segment is being saved is cleared.

If the segment searched for is found, the microprocessor 131 sets the flag 743, which indicates that the segment is being saved, corresponding to that segment and, after suppressing alteration on the data in that segment, starts saving.

Then, the microprocessor 131 conveys to the shared memory control circuit 141 an instruction to copy the pertinent segment to a designated address in the cache memory 152. Having received the instruction, the shared memory control circuit 141, using the data path 904, writes the data in the pertinent segment into the cache memory 152.

The microprocessor 131, When it receives from the shared memory control circuit 141 a notice that the pertinent segment has been copied into the designated address in the cache memory, writes the information in the pertinent segment, now copied in the cache memory 152, by use of the usual method of writing data in the cache memory 152 into a magnetic disk apparatus 600.

Upon completion of writing into the magnetic disk apparatus 600, the position and the check code of the written data are written into positional information 722 and the check code 723 of the segment on the corresponding magnetic disk apparatus 600 in segment 0 [701].

Finally, the microprocessor 131 clears the flag 742, which shows that the contents of the segment have been altered since it was saved, and the flag 743, which shows that the segment is being saved, corresponding to the saved segment in the shared memory control circuit 141.

In the foregoing sequence, the operation to save one segment into a magnetic disk apparatus 600 is completed.

Although this operation by the disk control units 130 during idling or on a periodical basis can reduce the length of time required by the shared memory 142 for saving when the disk array control apparatus 100 ends its operation, it may be sometimes better to refrain from this operation because it may impose an extra load on usual cache memory accessing or shared memory accessing.

Now will be described how the whole of the shared memory 142 (the configurational information 700) is saved in order to end the functioning of the disk array control apparatus 100.

First, the microprocessor 111 in the channel control unit 110 blocks inputs to and outputs from the host computer 200 so that no further updating of information takes place, and notifies the shared memory control circuit 141 of the blocked state.

The microprocessor 131 in the disk control units 130, at the moment it knows from the shared memory control circuit 141 that every channel control unit 110 has been blocked from inputs from and outputs to the host computer 200, writes all the unreflected write data present on the cache memory 152 into the magnetic disk apparatus 600.

The microprocessor 131 in the disk control units 130, upon completion of writing the data on the cache memory 152 into the magnetic disk apparatus 600, notifies the shared memory control circuit 141 of the completion.

Upon completion by every one of the microprocessors 131 of writing from the cache memory 152 into the magnetic disk apparatus 600, each microprocessor saves all the other segments than the unsaved segment 0 [701] into the magnetic disk apparatus 600 in the same manner as in saving the single segment in the shared memory 142.

The microprocessor 131 which learned earlier than all the others from control information in the shared memory control circuit 141 that all the other segments than segment 0 [701] had been saved into the magnetic disk apparatus 600 generates a check code for the whole from the check code 723 of every segment and writes it into a check code 715. Further, in order to know whether or not the corresponding segment needs restoration, it copies the flag 741, which indicates that every segment on the shared memory control circuit 141 is to be saved, onto a flag 721, which indicates that every segment on the shared memory 142 is to be saved. When all the sets of information are ready, the shared memory control circuit 141 computes the check code for information of all the segments to generate segment 0 [701] and saves it onto a fixed address on the magnetic disk apparatus 600 to complete saving of the whole shared memory 142 (the configurational information 700).

Figure 4:
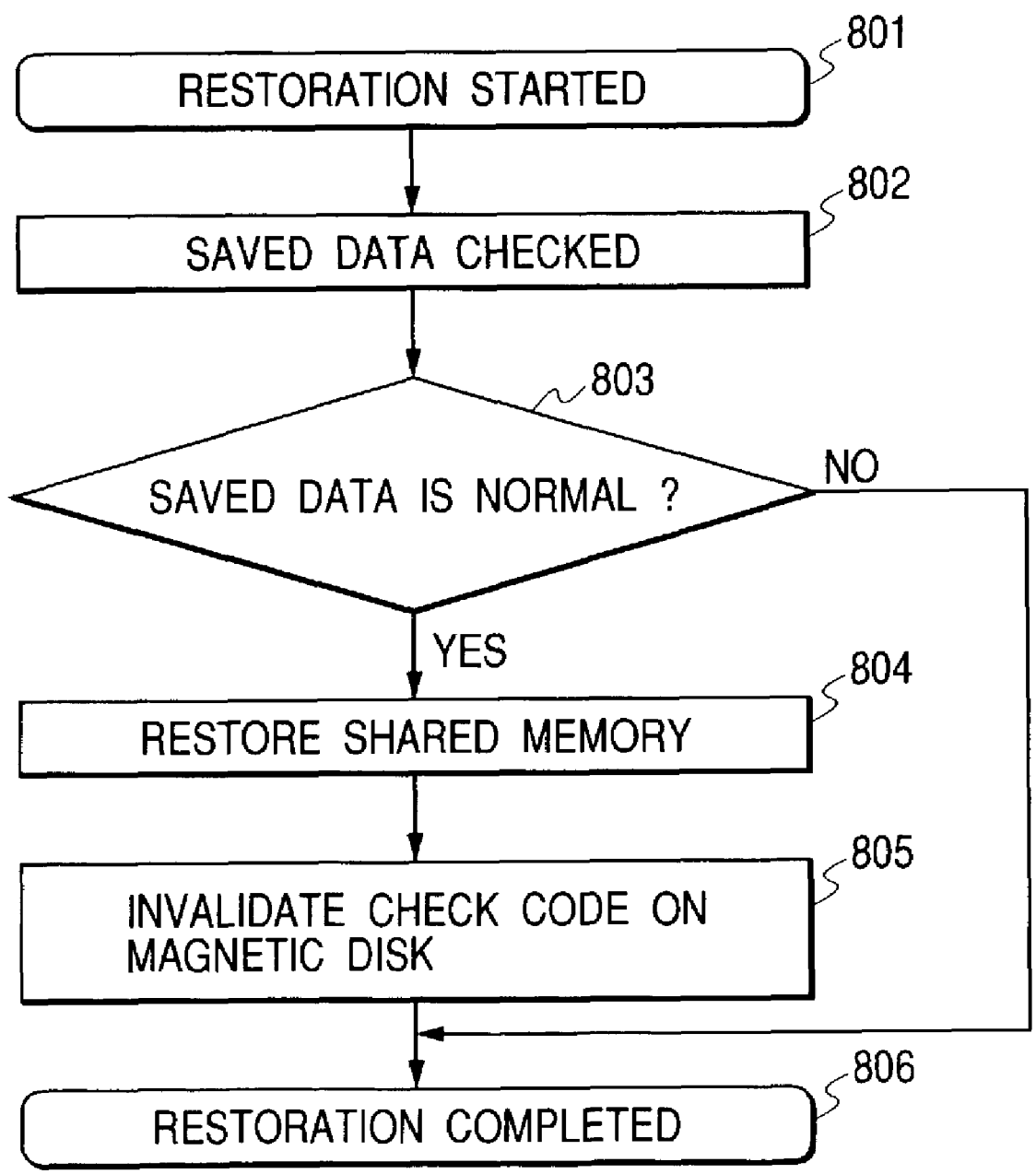
FIG. 4 is a flowchart showing another example of data restoring procedure in the shared memory in the storage system, which is the preferred embodiment of the invention.

Next will be described restoration of the saved data (the configurational information 700) in the shared memory 142 into the magnetic disk apparatus 600 with reference to FIG. 4.

When it is demanded to restore the data (the configurational information 700) in the shared memory 142 saved into the magnetic disk apparatus 600, the channel control unit 110 blocks inputs to and outputs from the host computer 200, and notifies the shared memory control circuit 141 of the blocked state for the restoration of the saved data in the shared memory 142. When every channel control unit 110 has blocked inputs from and outputs to the host computer, the restoration is started (control step 801).

The microprocessor 131 of the first disk control unit 130 having confirmed with the shared memory control circuit 141 the blocking of every channel control unit 110 from inputs from and outputs to the host computer 200 checks the absence of abnormality in the saved data on the basis of the information of segment 0 [701] on the magnetic disk apparatus 600 (control step 802), and determines the presence or absence of abnormality (control step 803).

In the absence of abnormality, first the microprocessor 131 of the disk control unit 130 copies segment 0 [701] on the magnetic disk apparatus 600 into the cache memory 152, and restores it by use of an instruction to cause the shared memory control circuit 141 to copy data out of a designated address in the cache memory 152 into the shared memory 142.

Regarding the rest of the segments, those on segment 0 [701] in FIG. 2 for which the flag 721, indicating that the segment is to be saved, is standing are restored on the basis of the positional information 722 on the magnetic disk apparatus 600.

Finally, the flag 721, which indicates that every segment on the shared memory 142 is to be saved is copied onto the flag 741, which indicates that every segment on the shared memory control circuit 141 is to be saved, and both the other flags 742 and 743 are cleared to complete restoration (control step 804).

Upon completion of the restoration, the microprocessor 131 of the disk control unit 130 invalidates the check code on the magnetic disk (control step 805).

When the operation so far described is completed, the microprocessor 131 notifies via the shared memory control circuit 141 the microprocessor 111, blocking the inputs from and outputs to the host computer, of the completion of restoration or of the failure of restoration on account of the irregularity of the saved data to complete the operation to restore the configurational information 700 (control step 806).

Figure 5:
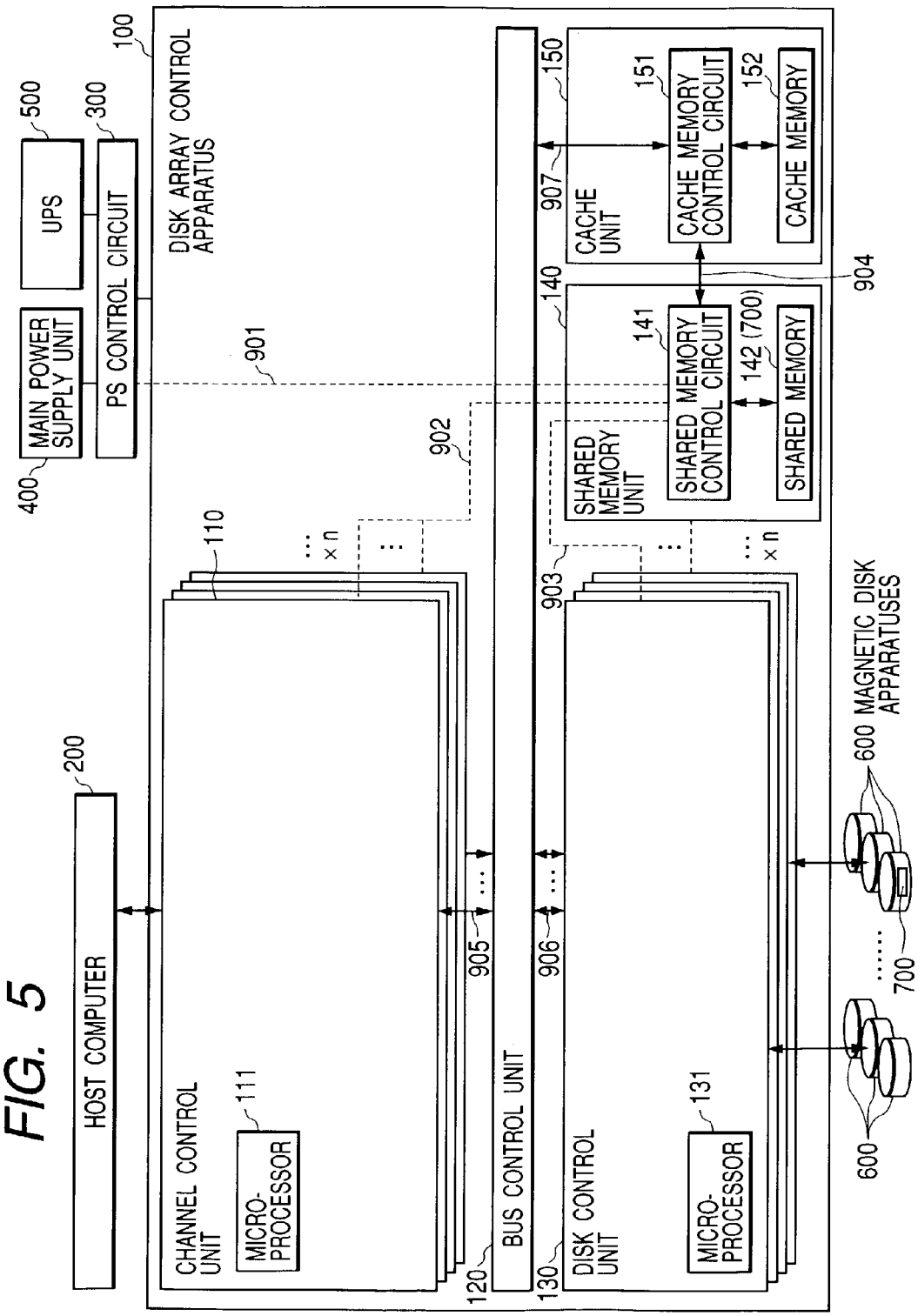
FIG. 5 is a conceptual diagram of a modified version of the configuration of the storage system, which is the preferred embodiment of the invention.

Described below with reference to FIG. 5 is an apparatus which can prevent the configurational information 700 and the like in the shared memory from being lost even during a long continuing power failure which an auxiliary power source such as the UPS 500 cannot cope with by saving the contents of the shared memory 142 into the non-volatile magnetic disk apparatus 600 even when power supply is stopped.

The apparatus illustrated in FIG. 5 has a control path 901 in addition to the configuration shown in FIG. 1, so that the PS control circuit 300 can make it known to the shared memory control circuit 141 that the power supply source has been switched from the main power supply unit 400 to the UPS 500.

The microprocessor 111 of each channel control unit 110 and the microprocessor 131 of the disk control unit 130, when notified by the shared memory control circuit 141 of the irregularity with the main power supply unit 400, saves the information in the shared memory 142 before the battery of the UPS 500 runs out by use of the above-described method of saving the whole contents of the shared memory 142 (the configurational information 700) before ending the functions of the disk array control apparatus 100.

When the normal state of the main power supply unit 400 is recovered, the configurational information 700 in the shared memory 142 is read out of the magnetic disk apparatus 600 in the same way as when the apparatus is shut down under any other condition to carry out restoration.

Since this embodiment of the invention, by use of the data path 904, can copy the configurational information 700 from the shared memory unit 140 into the cache unit 150 and, by use of the cache memory path 907 and the cache memory path 906 suitable for high-speed transferring of a large quantity of data as described above, can save the configurational information 700 into the magnetic disk apparatus 600, it has an advantage that a large quantity of configurational information 700 can be saved into the magnetic disk apparatus 600 in a short period of time without having to use the shared memory path 903 specialized for high-speed transferring of a small quantity of data. As a result, when the power supply to the whole system is to be backed up by the UPS 500 at the time of power failure for instance, it is made possible, even if no long time is available for the backup, to save a large quantity of configurational information 700 into the magnetic disk apparatus 600 securely.

Furthermore, since the processing of data transfers of the configurational information 700 from the cache unit 150 to the magnetic disk apparatus 600 is equivalent to that of usual user data transfers, the microprogram and other items of software need to be altered only in their parts concerned with the operation using the data path 904 to have the configurational information 700 copied from the shared memory unit 140 into the cache unit 150, and accordingly there is an additional advantage that the processing of software alterations can be minimized.

Also, this embodiment enables a storage system such as the disk array system to semipermanently store indispensable data for system operation, such as the configurational information 700, by saving data including the configurational information 700 in the shared memory 142 into the magnetic disk apparatus 600, the reliability of data such as the configurational information 700 in an emergency can be enhanced. It can also contribute to increasing the speed and accuracy of and labor saving in the restoration of data such as the configurational information 700.

The disk array control apparatus 100 in this embodiment, even if control is interrupted by a power failure, can quickly and properly restore the controlled state by use of the configurational information 700 and other data before the interruption.

Furthermore this embodiment, even if a power failure continues for a long period, can securely hold in the magnetic disk apparatus 600 the state of the configurational information 700 and the like before the interruption irrespective of the state of power supply, thereby contributing to enhancing the reliability of the operation.

Also, even where a large-scale alteration of the configurational information 700 is necessitated by maintenance work, system updating or the like, the configurational information 700 before the alteration can be securely preserved in the magnetic disk apparatus 600 as backup data.

Since only the data that has to be saved out of the configurational information 700 can be selectively saved according to various sets of information including those of the flags 741 through 743 and so forth, the quantity of saved data can be reduced and the length of time of required saving can be shortened. Further, by adding the check code 723 to the data to be saved and saving them into the magnetic disk apparatus 600, it is possible to pinpoint abnormal saved data at the time of restoration, prevent the configurational information 700 from being restored with wrong data, and thereby enhance the reliability of the saving/restoration of the configurational information 700.

(Embodiment 2)

Figure 6:
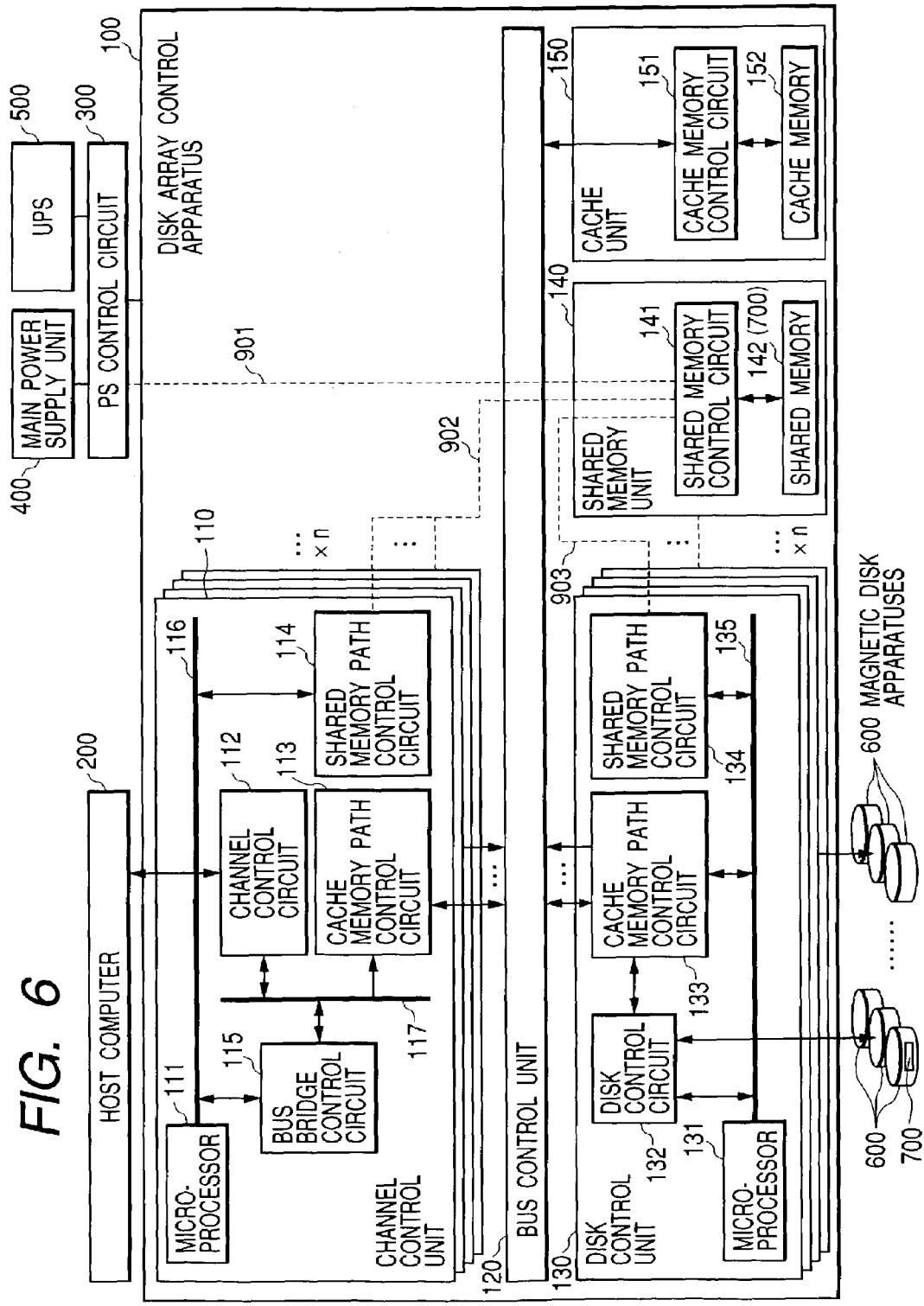
FIG. 6 is a conceptual diagram of one example of configuration of an information processing system containing a storage system, which is another preferred embodiment of the invention.

FIG. 6 is a conceptual diagram of one example of configuration of an information processing system containing a storage system, which is another preferred embodiment of the invention.

With respect to this embodiment will be described a case in which the configurational information 700 stored in the shared memory 142 is saved into the magnetic disk apparatus 600 by use of the routes and functions to access the shared memory unit 140 and the cache unit 150 without using the data path 904.

In this mode of implementing the invention, each of the plurality of channel control units 110 comprises a microprocessor 111, a first bus 116 connected to the microprocessor 111, a second bus 117 connected to this first bus 116 via a bus bridge control circuit 115, a channel control circuit 112 and a cache memory path control circuit 113 connected to the second bus 117, and a shared memory path control circuit 114 connected to the microprocessor 111 via the first bus 116.

Each of the plurality of disk control units 130 comprises a microprocessor 131, a bus 135 connected to the microprocessor 131, and a disk control circuit 132, a cache memory path control circuit 133 and a shared memory path control circuit 134 all connected to the bus 135.

In its usual input/output operation with the host computer 200, when data in the host computer 200 is to be written into the magnetic disk apparatus 600 for instance, the data propagates from the host computer 200 to the channel control unit 110 via the channel control circuit 112 and, going via the second bus 117, the cache memory path control circuit 113 and the cache memory control circuit 151 is stored into the cache memory 152. The data stored into the cache memory 152 is read out by the disk control circuit 132 in the disk control unit 130 and written into the magnetic disk apparatus 600.

Reading data out of the magnetic disk apparatus 600 to the host computer 200 takes place by the reverse routing.

When shared memory data (the configurational information 700) is to be written or read by the host computer 200 into or out of the magnetic disk apparatus 600, the data may be shared between the channel control unit 110 and the disk control units 130 or used as cache control information. The microprocessor 111 of the channel control unit 110 accesses the shared memory 142 via the shared memory path control circuit 114 and the shared memory control circuit 141 (the shared memory path 902). In the disk control unit 130 as well, the microprocessor 131 accesses the shared memory 142 via the shared memory path control circuit 134 and the shared memory control circuit 141 (the shared memory path 903).

When any trouble interrupts the supply of power from the main power supply unit 400, the takeover of power supply by the uninterrupted power supply apparatus (UPS) 500 or the like keeps the whole system supplied with power as long as required for the processing to save the data to be written into the cache memory 152 into the magnetic disk apparatus 600 or the processing, to be described afterwards, to save information in the shared memory 142 into the magnetic disk apparatus 600.

Figure 7:
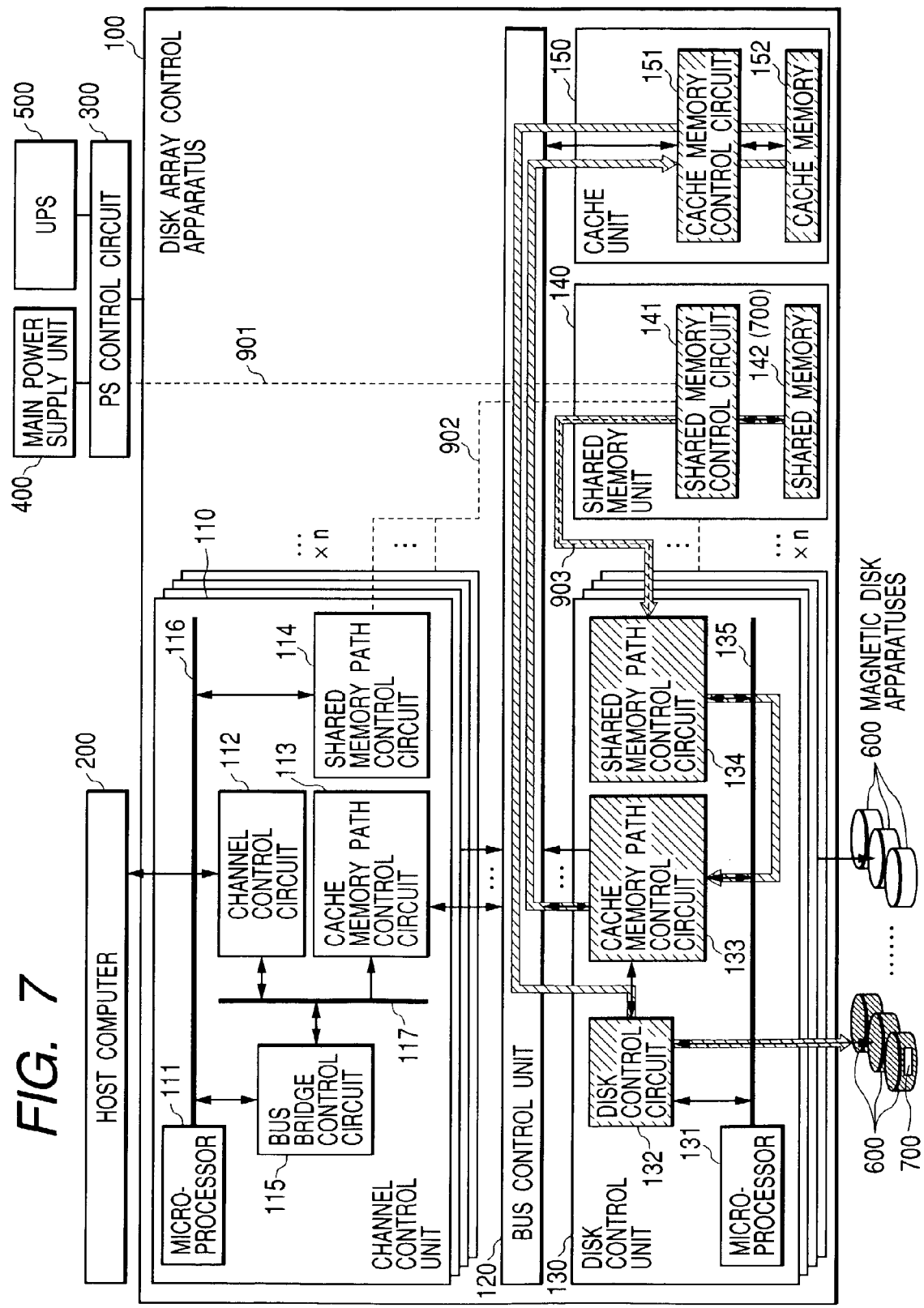
FIG. 7 is a conceptual diagram of one example of action of the storage system, which is the other preferred embodiment of the invention.

FIG. 7 shows the flow of data in this mode of implementation when the configurational information 700 in the shared memory 142 is saved into the magnetic disk apparatus 600.

When the saving is executed, the shared memory path control circuit 134 in the disk control units 130 issues an instruction to the shared memory control circuit 141 to have information in the shared memory 142 read out. The data read out by the shared memory path control circuit 134 is written into a data transfer buffer in the cache memory path control circuit 133 via a path in the disk control units 130. The cache memory path control circuit 133 writes the data written into the buffer into the cache memory 152 via the bus control unit 120 and the cache memory control circuit 151. Then one or a plurality of the disk control units 130 read out the data that has been written in via the bus control unit 120 and the cache memory path control circuit 133, and write it into the magnetic disk apparatus 600 that is connected via the disk control circuit 132.

A characteristic point of this embodiment of the invention consists in that the saved data is written into a data transfer buffer in the shared memory path control circuit 134.

In the restoration process, the saved data is transferred from the magnetic disk apparatus 600 in the reverse procedure to the disk control circuit 132, the cache memory path control circuit 133, the shared memory path control circuit 134, and the shared memory control circuit 141 and the shared memory 142 in the shared memory unit 140.

Figure 8:
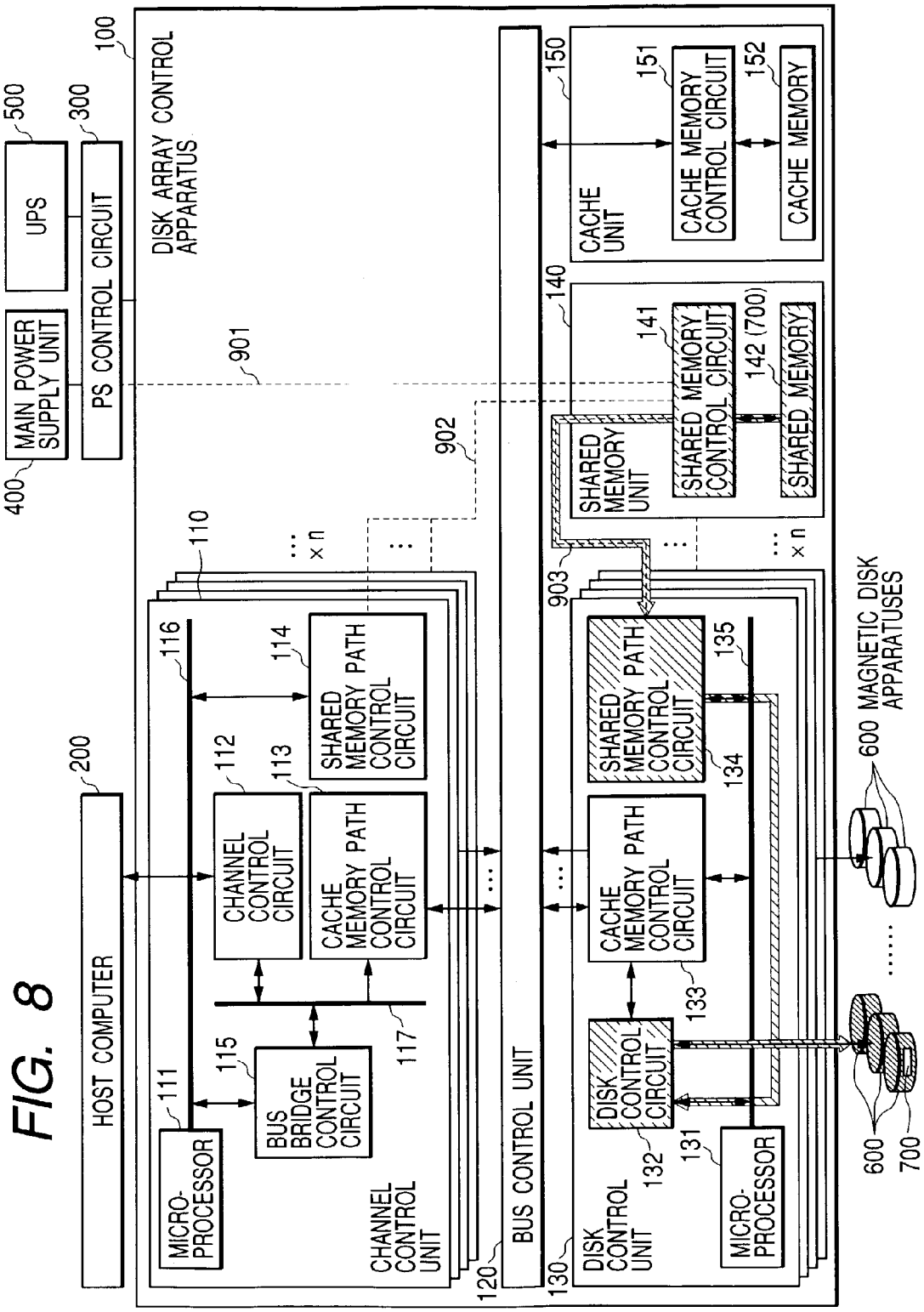
FIG. 8 is a conceptual diagram of a modified version of the storage system, which is the other preferred embodiment of the invention.

FIG. 8 shows the flow of data in this mode of implementation when the configurational information 700 in the shared memory 142 is saved into the magnetic disk apparatus 600 hardware-wise.

This flow differs from the above-described case shown in FIG. 6 in that the data read out of the shared memory 142 is directly written by the shared memory path control circuit 134 into a buffer provided in the disk control circuit 132 by way of a path (the bus 135) in the disk control units 130. The disk control circuit 132 writes the data written into the buffer into the magnetic disk apparatus 600.

In the restoration process, the saved data written into the magnetic disk apparatus 600 is transferred in the procedure reverse to what was described regarding this embodiment from the magnetic disk apparatus 600 to the shared memory 142.

Figure 9:
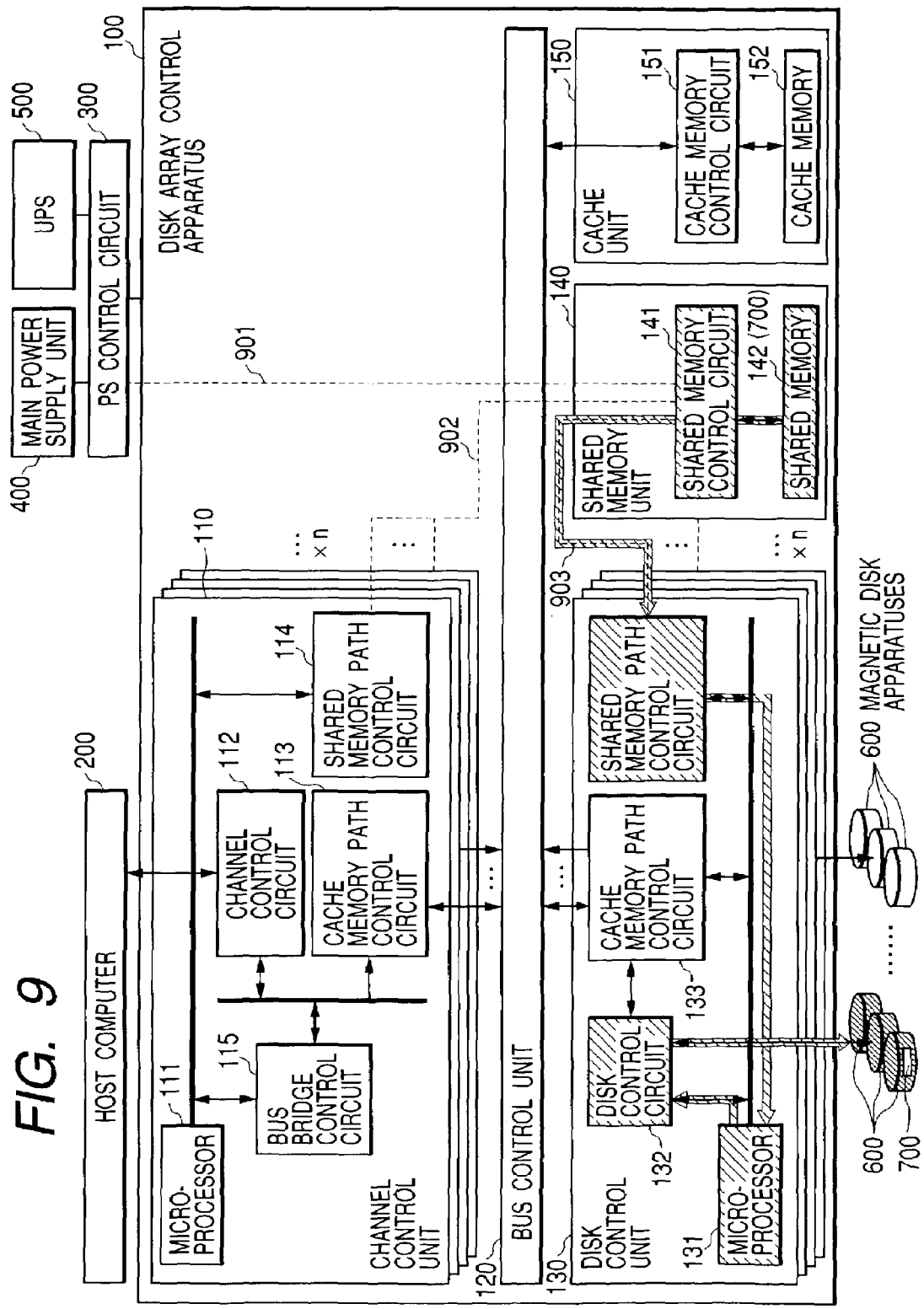
FIG. 9 is a conceptual diagram of another modified version of the storage system, which is the other preferred embodiment of the invention.

FIG. 9 shows the flow of data when a microprocessor saves information in the shared memory into the magnetic disk apparatus 600 by a microprogram or the like software-wise.

When the saving is executed, the microprocessor 131 of the disk control unit 130 reads out information in the shared memory 142. The shared memory data (the configurational information 700) read out via the shared memory control circuit 141 and the shared memory path control circuit 134 is written by the microprocessor 131 into a buffer in the disk control circuit 132, and the disk control circuit 132 writes the data written into the buffer into the magnetic disk apparatus 600.

In the restoration process, the saved data written into the magnetic disk apparatus 600 is transferred in the procedure reverse to what was described regarding this embodiment from the magnetic disk apparatus 600 to the shared memory 142.

Figure 10:
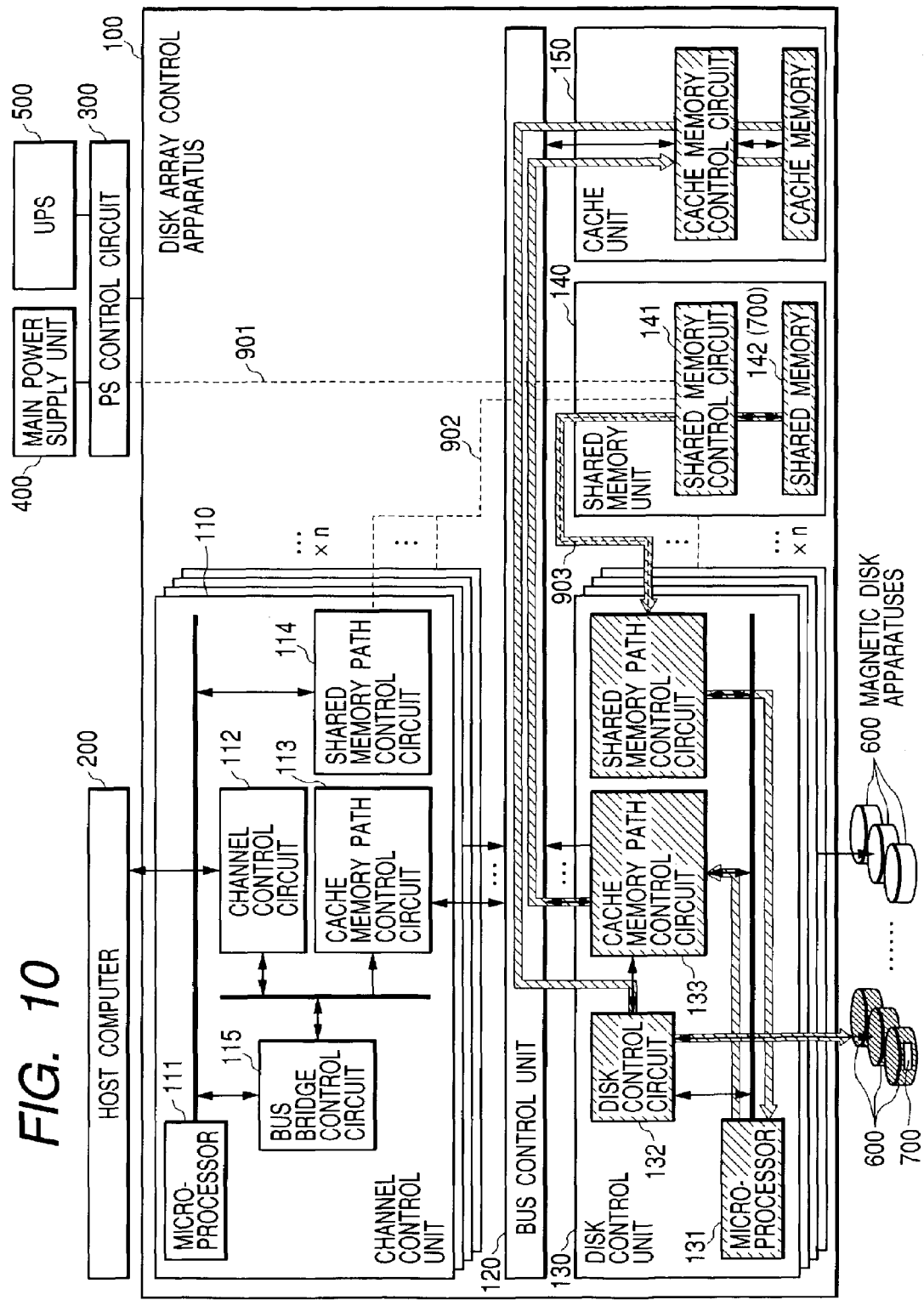
FIG. 10 is a conceptual diagram of still another modified version of the storage system, which is the other preferred embodiment of the invention.

FIG. 10 shows the flow of data when information in the shared memory 142 is saved into the magnetic disk apparatus 600 with the intervention of the microprocessor 131 (by a microprogram software-wise).

This flow differs from the above-described case shown in FIG. 9 in that the data read out of the shared memory 142 via the shared memory control circuit 141 and the shared memory path control circuit 134 is written by the microprocessor 131 into a buffer provided in the cache memory path control circuit 133 and once transferred to the cache memory 152 via the bus control unit 120 and the cache memory control circuit 151. One or a plurality of the disk control units 130 read out the shared memory data that have been written into the cache memory, and write them into the magnetic disk apparatus 600.

In the restoration process, the saved data written into the magnetic disk apparatus 600 is transferred in the procedure reverse to what was described regarding this embodiment from the magnetic disk apparatus 600 to the shared memory 142.

This Embodiment 2 has an advantage that, in addition to providing the same benefits as Embodiment 1 described above, saving of the configurational information 700 in the shared memory unit 140 into the magnetic disk apparatus 600 can be realized by only slightly modifying the software, such as microprograms controlling the microprocessor 111 and the microprocessor 131, at a low cost without having to provide the data path 904 between the shared memory unit 140 and the cache unit 150, i.e. with the existing apparatus configuration intact with no hardware revision involved.

Since Embodiments 1 and 2 described above store the control information 700 into the magnetic disk apparatus 600 under the command of the disk array control apparatus 100 as described above, it can be determined whether or not the present invention is implemented by checking the data stored in the magnetic disk apparatus 600 and determining the presence or absence of the control information 700 or an area for its storage.

The invention set forth in the claims of the present application can be expressed as follows from another point of view.

(1) A storage control apparatus intended for controlling a superior apparatus and storage apparatuses, provided with a shared memory wherein a data path is disposed between the shared memory and a cache memory and control information in the shared memory can be saved into a non-volatile storage apparatus via the cache memory.

(2) A storage control apparatus intended for controlling a superior apparatus and storage apparatuses, provided with a shared memory wherein part or the whole of information in the shared memory is saved into a non-volatile storage apparatus in accordance with requests from software and hardware.

(3) A modification of the storage control apparatus according to paragraph (2), wherein the data saved in the shared memory is assessed as to whether or not the saving was normally completed according to a redundant code added at the time of saving so that no abnormal data is restored.

(4) A storage control apparatus capable of preventing information in the shared memory from being lost even when power supply is interrupted for too long a period for an auxiliary power source to cope with, by saving the contents of the shared memory into a non-volatile storage apparatus even when power supply is stopped.

(5) A storage control apparatus intended for controlling a superior apparatus and storage apparatuses, provided with a shared memory wherein shared memory data is read out of or written into a non-volatile memory such as a magnetic disk apparatus by transmitting and receiving the shared memory data between a shared memory path control circuit and a cache memory path control circuit of a disk control unit.

(6) A storage control apparatus intended for controlling a superior apparatus and storage apparatuses, provided with a shared memory wherein shared memory data is read out of or written into a non-volatile memory such as a magnetic disk apparatus by transmitting and receiving the shared memory data between a shared memory path control circuit(s) and a disk control circuit(s) of one or a plurality of disk control units.

(7) A storage control apparatus intended for controlling a superior apparatus and storage apparatuses, provided with a shared memory wherein shared memory data is read out of or written into a non-volatile memory such as a magnetic disk apparatus by transmitting and receiving the shared memory data between a shared memory path control circuit(s) and a disk control circuit(s) of one or a plurality of disk control units via a processor(s) of the disk control unit(s).

(8) A storage control apparatus intended for controlling a superior apparatus and storage apparatuses, provided with a shared memory wherein shared memory data is read out of or written into a non-volatile memory such as a magnetic disk apparatus by once writing it into the cache memory of a cache control unit through a cache memory path control circuit via a shared memory path control circuit of a disk control unit and a processor of the disk control unit and going through the shared memory path control circuit(s) and the disk control circuit(s) of one or a plurality of the disk control units.

Although the invention achieved by the present invention has been hitherto described with reference to specific embodiments thereof, it goes without saying that the invention is not limited to those embodiments but can be modified in various ways without deviated from its essentials.

For instance, the non-volatile storage apparatus does not need to be a magnetic disk apparatus for storing usual data, and a non-volatile storage apparatus provided separately from the magnetic disk apparatus may be used instead.

By saving data in the shared memory into the magnetic disk apparatus, it is made possible to semipermanently store the data and to enhance the reliability of the control information in an emergency. Contributions can also be made to increasing the speed and accuracy of, and labor saving in, the restoration of the data.

If control is interrupted by a power failure or the like, it is possible to restore the control state before the interruption.

Even if a state of power interruption continues for a long period, the state before the interruption can be held irrespective of the state of power supply.

While the present invention has been described with reference to certain preferred embodiments thereof, it is to be understood that various modifications, alternatives, and restructuring are possible without deviating from the spirit and the scope of the invention as defined in the appended claims.

What is claimed is:

1. The storage system comprising:
a plurality of non-volatile storage apparatuses; and
a storage control apparatus for controlling delivery of information between said storage apparatuses and a superior apparatus,
wherein said storage control apparatus comprises:
a cache memory for temporarily storing said information; and
a shared memory for storing control information for said storage control apparatus,
wherein said storage control apparatus has a function to save said control information stored in said shared memory into a storage apparatus, and
wherein said storage control apparatus further has a function to determine whether or not the saving was normally accomplished by adding a redundant code to said control information and writing it into said storage apparatus and a function to prevent, when attempting to restore said control information saved into said storage apparatus into said shared memory, the restoration of said control information if it is determined to be abnormal according to said redundant code.

2. A storage system comprising:
a plurality of non-volatile storage apparatuses; and
a storage control apparatus for controlling delivery of information between said storage apparatuses and a superior apparatus,
wherein said storage control apparatus comprises:
a cache memory for temporarily storing said information; and
a shared memory for storing control information for said storage control apparatus,
wherein said storage control apparatus is provided with a data path between said cache memory and said shared memory, and with a function to save said control information in said shared memory into a storage apparatus via said data path and said cache memory, and
wherein said storage control apparatus further has a function to determine whether or not the saving was normally accomplished by adding a redundant code to said control information and writing it into said storage apparatus and a function to prevent, when attempting to restore said control information saved into said storage apparatus into said shared memory, the restoration of said control information if it is determined to be abnormal according to said redundant code.

3. A storage system comprising:
a plurality of non-volatile storage apparatuses; and
a storage control apparatus which controls delivery of information between said storage apparatuses and a superior apparatus,
wherein said storage control apparatus is provided with a cache memory for temporarily storing said information and a shared memory for storing control information,
wherein said storage control apparatus saves said control information read out of said shared memory into a storage apparatus via, or not via, said cache memory, and
wherein said storage control apparatus further has a function to determine whether or not the saving was normally accomplished by adding a redundant code to said control information and writing it into said storage apparatus and a function to prevent, when attempting to restore said control information saved into said storage apparatus into said shared memory, the restoration of said control information if it is determined to be abnormal according to said redundant code.

* * * * *